United States Patent [19]

Waters

[11] Patent Number: 4,764,918
[45] Date of Patent: Aug. 16, 1988

[54] TELECOMMUNICATION SWITCHING SYSTEM

[75] Inventor: Derek B. Waters, Chelmsford, Great Britain

[73] Assignee: STC PLC, London, England

[21] Appl. No.: 904,640

[22] Filed: Sep. 8, 1986

[30] Foreign Application Priority Data

Sep. 24, 1985 [GB] United Kingdom ............... 8532583

[51] Int. Cl.$^4$ .............................................. H04J 1/16
[52] U.S. Cl. ...................................... 370/14; 379/12; 379/25
[58] Field of Search ............ 370/58, 13, 110.1, 16, 370/14; 379/9, 10, 12, 15, 16, 25; 340/825.01, 827

[56] References Cited

U.S. PATENT DOCUMENTS

| | | | |
|---|---|---|---|
| 4,376,998 | 3/1983 | Abbott et al. | 370/13 |
| 4,397,020 | 8/1983 | Howson | 370/13 |
| 4,592,044 | 5/1986 | Ferenc | 370/13 |
| 4,601,028 | 7/1986 | Huffman et al. | 370/13 |

Primary Examiner—Douglas W. Olms
Assistant Examiner—Frank M. Scutch, III
Attorney, Agent, or Firm—Lee & Smith

[57] ABSTRACT

An electronic switching network for use as a transit exchange, interconnects PCM digital trunks, and handles large numbers, e.g. 1,000 inlets and 1,000 outlets of such trunks. The switching network is fully electronic, using integrated circuit units. To provide a self-checking function, the intelligence arriving via the trunks is converted (2) into a redundant line code, e.g. 3B-6B, which has spare code combinations which are used to provide an auxiliary data channel through the switch matrix (3). The converter (2) applies to that data channel the inlet port number for a connection via the switch matrix (3). At the outlet side another converter (4) converts back to the line code (e.g. HDB-3) used over the trunks, and also extracts the inlet port number. This is then compared with what it should be, and the result of this comparison indicates whether the switch is functioning correctly. Thus the checking occurs while the switch is handling traffic.

5 Claims, 5 Drawing Sheets

TELECOMMUNICATION SWITCHING SYSTEM

The present invention relates to an automatic digital distribution frame (ADDF), i.e. to what is in effect a transit exchange which interconnects two sets of trunks, with facilities for switching between the trunks of the two sets.

According to the present invention, there is provided an automatic telecommunications switching arrangement, in which the arrangement includes electronic switching means via which inlets to and outlets from the arrangement are interconnected, in which intelligence in digital form is handled within the switching arrangement using a redundant line code whose characteristics are such that spare code combinations are available, which spare combinations are used to provide auxiliary data channels, which auxiliary data channels are used to transmit data through the switching means, in which the data transmitted through the switching means via a said auxiliary channel includes for each inlet-outlet connection which is established the inlet port number for the inlet involved in that connection, and in which at an outlet involved in the connection the inlet port number as received via a said auxiliary channel is extracted and compared with the expected inlet port number, the result of said comparison being indicative of the correct or incorrect operation of the switching means, whereby the operation of the arrangement is checked while the arrangement is handling traffic.

An embodiment of the invention will now be described with reference to the accompanying drawings, in which FIG. 1 is a block diagram to show how a switch embodying the invention is interfaced to the trunks to be interconnected, two such trunks being shown.

INTRODUCTIONS

The ADDF has been designed to be able to meet a wide variery of capacities, as follows:

| | | |
|---|---|---|
| 1000 × 1000 | Two-way | 2 Mbit/sec. trunks |
| 105 × 105 | Two-way | 6 Mbit/sec. trunks |
| 450 × 450 | Two-way | 8 Mbit/sec. trunks |
| 150 × 150 | Two-way | 34 Mbit/sec. trunks |
| 15 × 15 | Two-way | 45 Mbit/sec. trunks |
| 40 × 40 | Two-way | 140 Mbit/sec. trunks |

This range of capacities was developed to meet the requirements of a particular customer; the system to be described herein has a maximum capacity of 2048 two-way trunks, irrespective of bit rate.

Thus it will be seen that the arrangement is intended to provide a number of very large capacity switching networks. The ADDF described herein uses two parallel-arranged switches, one for each direction of transmission, the switches using active cross-points. The traffic through the switch is pleisiochronous. Rapid change of connections through the switch are needed to deal with transmission faults.

Because of the amount of self-testing incorporated into the switch, the switch is not duplicated. Note that it is now fashionable to call a multi-stage switching network, or even a complete telecommunications exchange, a switch. The switch is initially installed with racks and shelves equipped for maximum size, but may be only partially equipped on initial installation.

Figure 1:
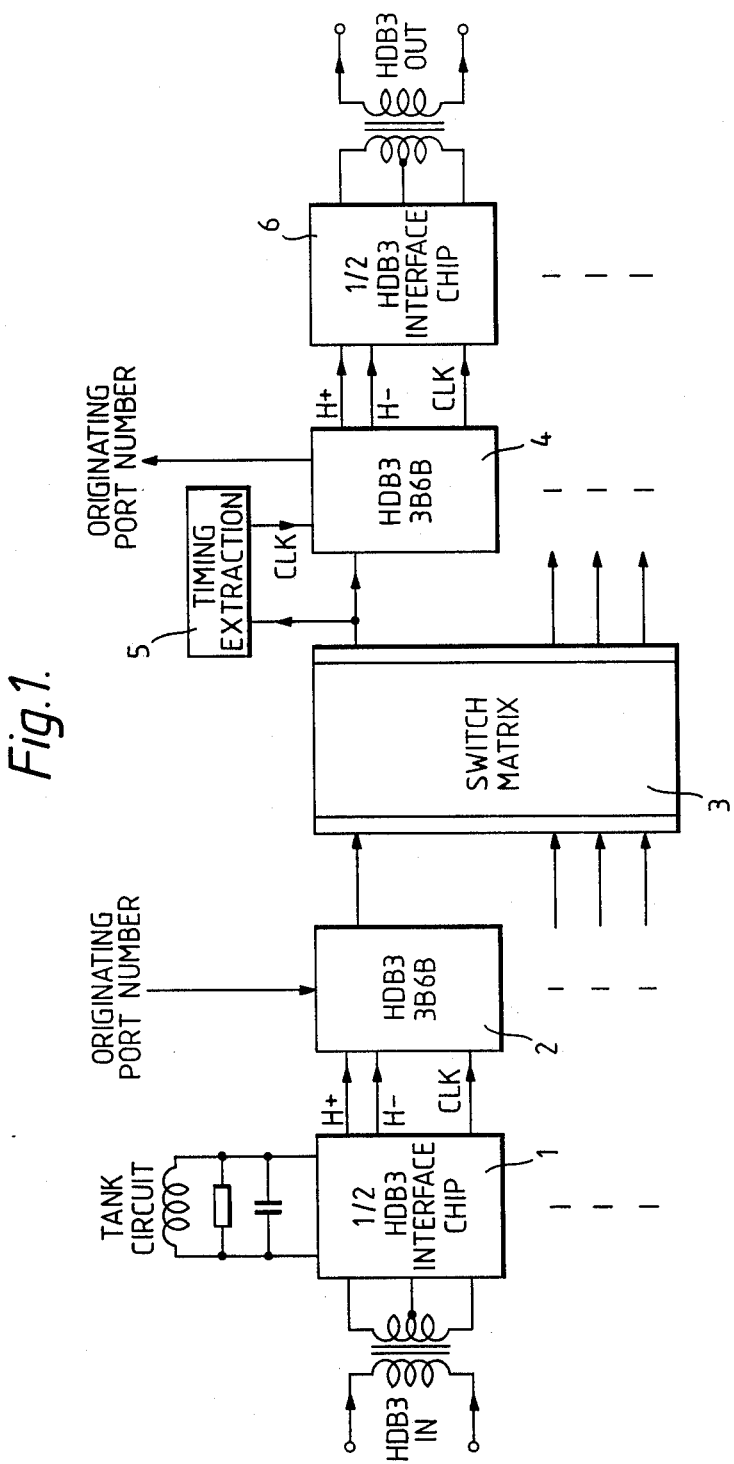

Transmission Aspects (FIG. 1)

This assumes that the system is intended to interconnect 2 Mb/sec. trunks, although the principles are applicable to other sizes and other types of trunks. The trunks carry PCM intelligence, coded in the now well-known HDB-3 format. Each incoming trunk is transformer-coupled to half of an HDB-3 interface chip, the output of which goes to a block 2, which translates the incoming intelligence from HDB-3 into a 3B-6B code, as set out in the following table. In addition, the originating port number, i.e. the number of the incoming trunk, as "seen" from the system is impressed onto the data stream, as will be indicated below.

| DATA INPUT | 3B-6B LINE CODE | |
|---|---|---|
| | LINE CODE | |
| | AUX.DATA "1" | AUX.DATA "0" |
| 000 | 011001 | 100101 |
| 001 | 101001 | 110001 |
| 010 | 101010 | 110010 |
| 011 | 001011 | 010011 |
| 100 | 101100 | 110100 |
| 101 | 001101 | 010101 |
| 110 | 001110 | 010110 |
| 111 | 011010 | 100011 |

It should be noted that other redundant line codes such as 5B-6B can be used for the transmission through the switch.

As can be seen from the table, the 3B-6B is a double-rate binary code whose bit stream is balanced to DC, and carries its own timing. Hence it can be AC coupled and regenerated, and can be transmitted through logic gates. Spare states in the code are used to provide an auxiliary data channel at 2048/3 k bits/sec. which can be used to check switch functions. It can also be used to convey the impressed originating port number.

Each six-bit word in the 3B-6B line code has three 0 bits and three 1 bits, which permits error checking. The output of the converter 2 is applied to the switch matrix 3, whose outputs are each applied to a converter 4 which converts back to the HD-B3 format. At the switch output there is also a timing extraction circuit 5, whose outputs control, inter alia, the converter 4. At this conversion stage, the originating port number which was inserted by the converter 2, is removed.

The output from the converter 4 goes to the other half 6 of an HDB-3 interface chip, whose output is transformer-coupled to an outgoing trunk. Thus the DDB-3 interface chip has one half for receiving the intelligence from a trunk and converting it into the line code used in the switch, and another half for performing the reverse function.

Transmission between the stages of the switch 3 is balanced over wire pairs, and the switch output is regenerated and checked for errors prior to the conversion back to HDB-3. The conversions referred to above are done by a ULA (Uncommitted Logic Array), designed specifically for such conversions.

Switch Realisations

Figure 2:
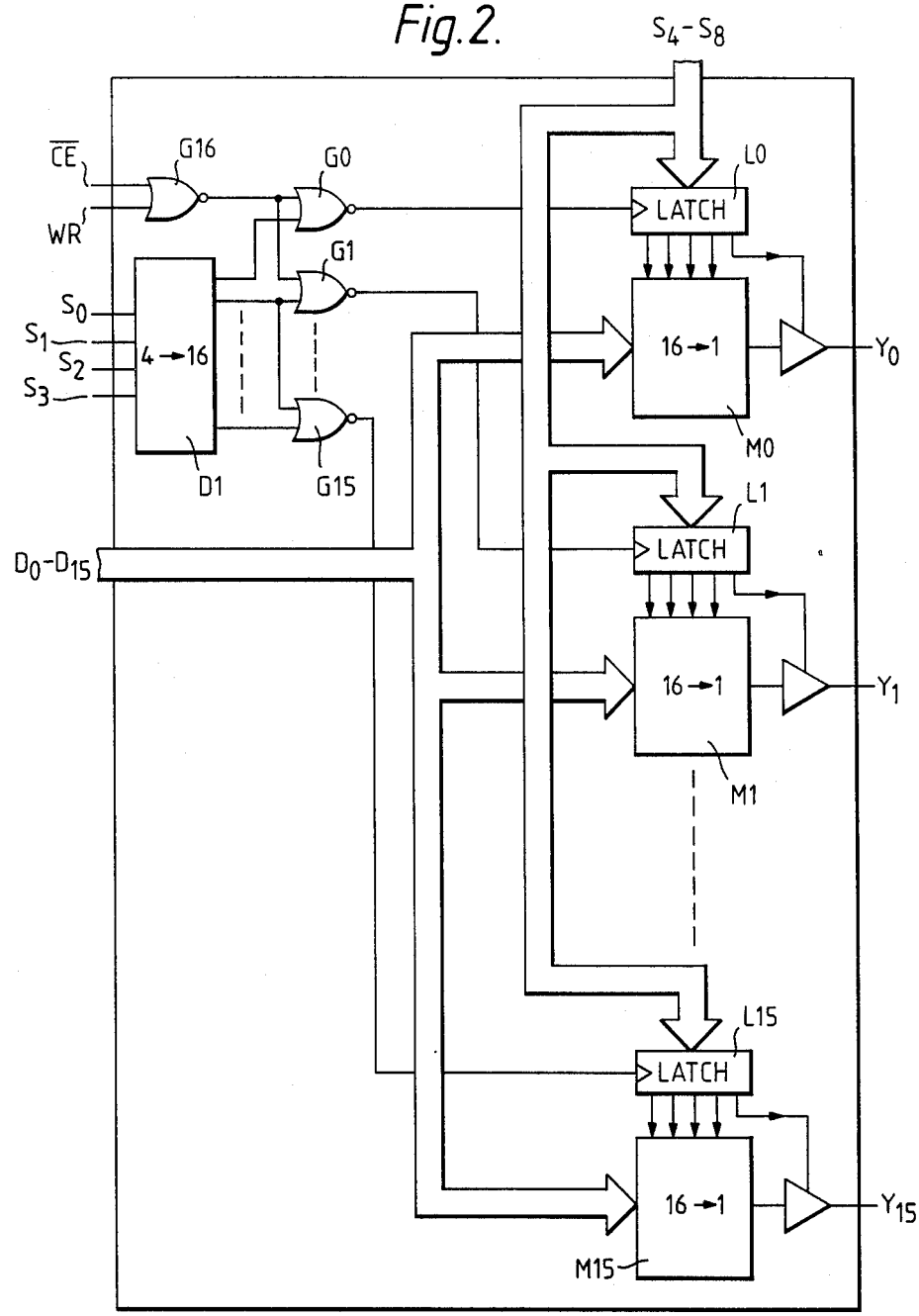
FIG. 2 is a block schematic of a 16×16 switch made up from integrated circuit units, the switching means using numbers of such switches interconnected to form larger switches.

The cross-points which make up the various stages and parts of stages of the switch are arranged, see FIG. 2, as a 16×16 matrix, using a CMOS ULA which consists of about 2100 gates. The sixteen switch inputs D0–D15 are connected to a set of sixteen 16-to-1 multiplexers M0–M15, all inputs being connected to all multiplexers. The multiplexers are respectively controlled by five-bit latches L0–L15. This arrangement switches the signal at logic level through the gates without retiming. As can be seen, a single input can be connected to any number (including one) of outputs. These outputs are tri-state to enable parallelling.

The five-bit latches are loaded via nine control lines S0 to S8, of which the lines S4–S8 influence the latches directly. S0 to S3, which are the latch selection lines are applied to a 4-to-16 decoder D1 whose output identifies which latch is to be selected. Each of these outputs is applied via a gate such as G0 for latch L0 to its latch, and the information applied via lines S4–S8 is therefore set into the latch selected in response to the information on lines S0 to S3.

The first of these gates is also controlled from an input control gate G16, whose inputs are for write control WR, and for the inverse of CE, which is a clock extraction input. Each of the other gates is controlled partly from the preceding gate's output from the decoder D1.

Four cross-point arrays each as shown in FIG. 2 with supporting logic for control and transmission can be mounted on a single board to give a 32×32 array. Two such boards can be interconnected to give 32×64 or 64×32 arrays, while four can be connected to give a 64×64 array.

Figure 3:
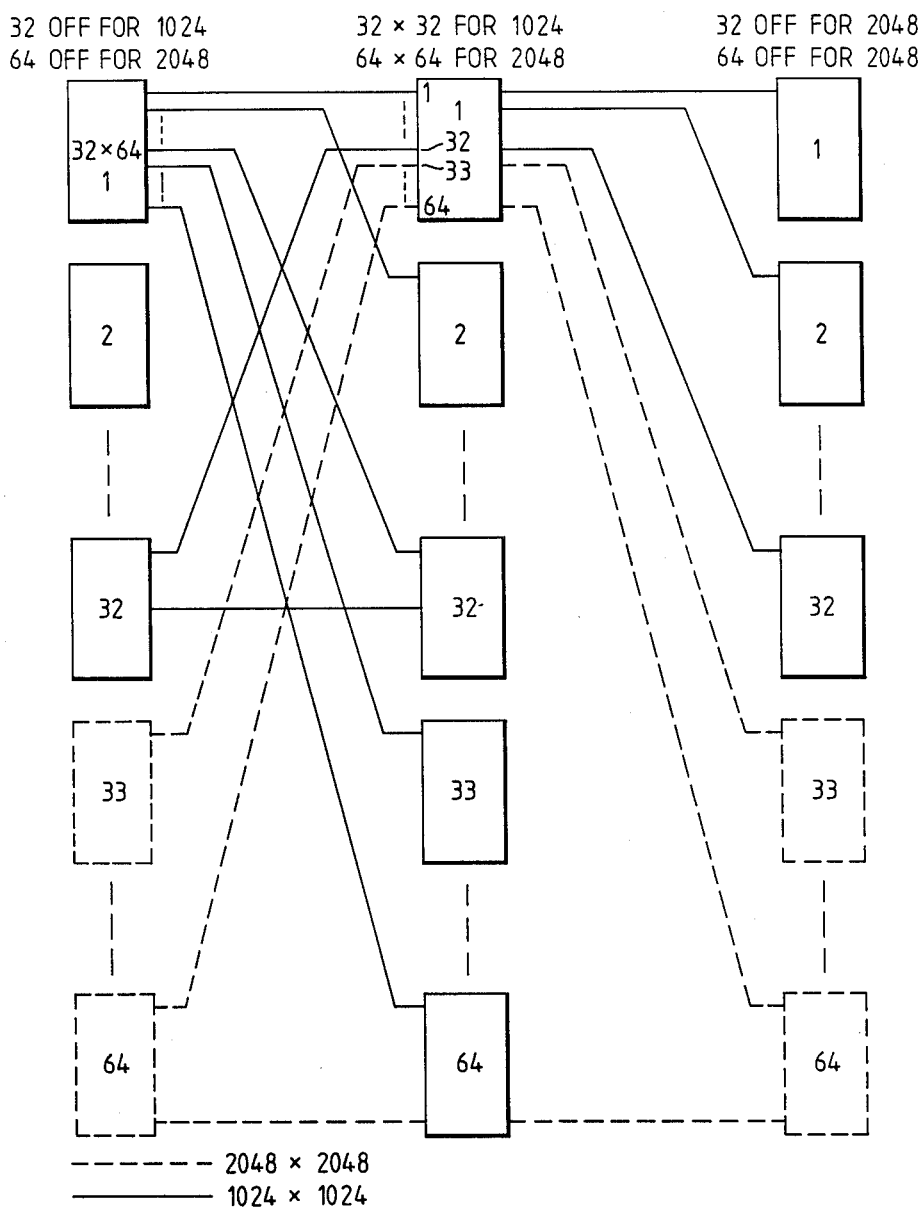
FIG. 3 is a block schematic which shows how 32×64 and 64×64 switches themselves assembled from switches such as shown in FIG. 2 can be assembled to provide a three stage 1024×1024 or 2048×2048 switching assembly.

A 1024×1024 non-blocking three stage switch can be build as shown in FIG. 3 from switch boards such as described above. For such a switch, the first stage uses thirty-two 32×64 arrays, each consisting of two boards, and the second stage uses sixty-four 32×32 arrays, each a single board. In actual fact 63 second stage arrays would be accurate, but it has been found to be more convenient to provide 64 such arrays. The third stage consists of thirty-two 64×32 switches.

As already indicated one such 1024×1024 switch is used for each direction of transmission. Since the size to be catered for is 1000×1000, there are twenty-four ports (i.e. inlets to, and outlets from, the switch) available for test equipment or loop backs.

With a maximum size of 64×64 available for each module of the array of FIG. 3, a three-stage non-blocking switch can have a maximum size of 2048×2048, as indicated by the two sets of numbers inserted above the switching stages in FIG. 3. The switch can be partially equipped to provide a 1024×1024 switch, in which case the modules and inter-stage links shown in solid lines are provided. The switch can then be expanded to the full size of 2048×2048 without interrupting existing traffic by the provision of the modules and links shown in broken lines. This expansion can occur in a number of stages if called for by traffic conditions. The second stage switch modules start as single-board 32×32 switches, and are expanded to 64×64 by the addition of three boards per switch. The first stage switch modules are always 32×64, and the third stage modules are always 64×32, but the number of such modules is increased in each case from 32 to 64 during expansion.

Transmission between switch stages is balanced over twisted-pair wiring, which is cheaper and less bulky than coaxial cable, and can tolerate longitudinal interference.

The switch array can set up calls to test access and monitoring ports, either by a "tee" connection, or by a serial connection.

ADDF Control

The mechanical assembly uses multi-shelf racks, and for line shelves, each shelf contains sixteen line cards, plus controller, plus duplicated power units. Each such line card has four two-way ports. The switch cards are also assembled into shelves, and each such shelf contains sixteen switch cards, plus controller and duplicated power units.

Figure 4:
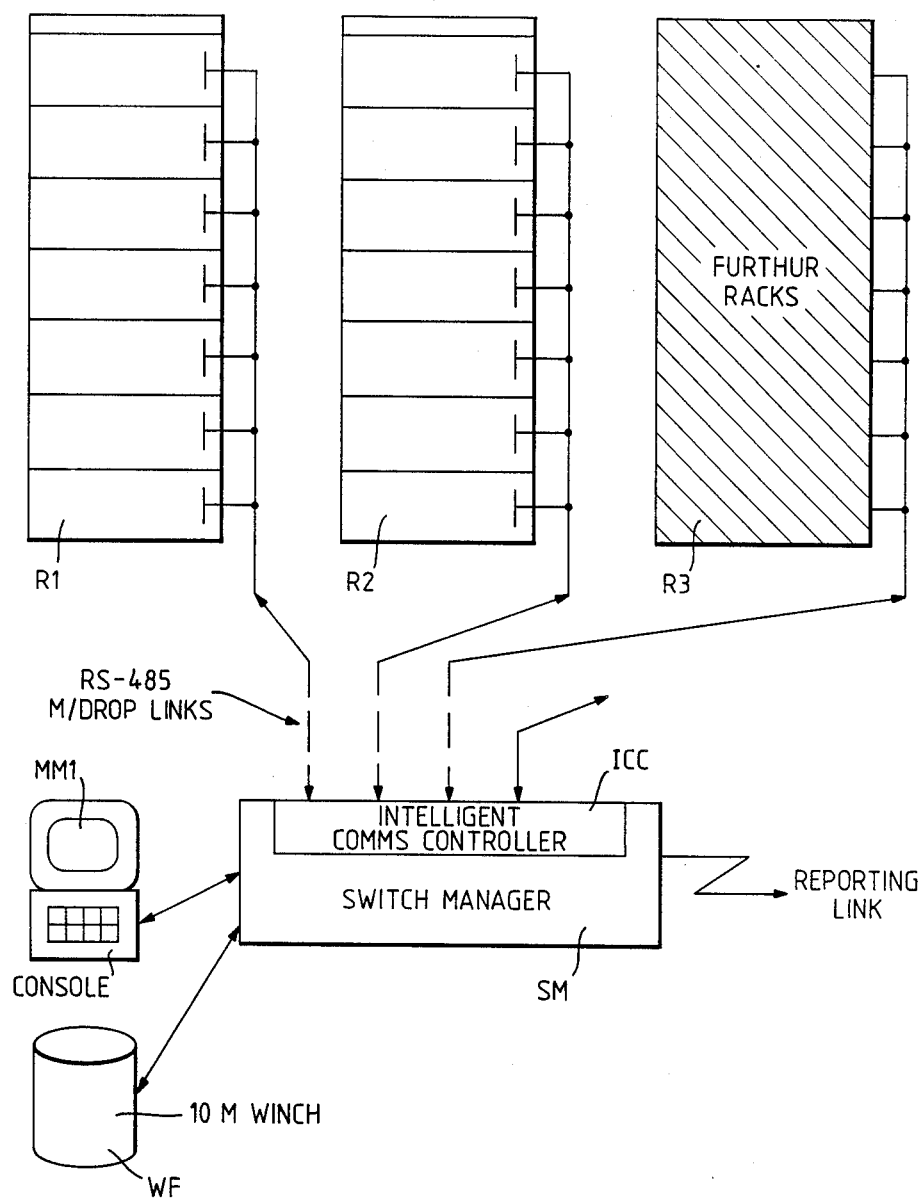
FIG. 4 is a general control block diagram for an ADDF system which uses a switching assembly (also itself known as a switch) of the type shown in FIG. 3.

FIG. 4 schematically shows the general control arrangement, and shows three racks R1, R2, R3, each with seven shelves, and each shelf has an intelligent shelf controller card. The shelf controllers each communicates with peripheral cards in its shelf by a general purpose backplane bus, and with the Switch Manager SM via an RS-485 line (multi-drop), as shown. All shelf controllers in the same rack communiate with the Switch Manager SM, which contains the necessary mass storage devices for the storage of system configuration, diagnostic status and fall-back routings.

The Switch Manager SM communicates with the multi-drop links via an intelligent communications controller ICC, intelligent in the context indicating that it has its own micro-processor. Also associated with the Switch Manager SM are an operator's console which acts as a man-medium interface (MMI), and further mass storage provided by 10 megabit Winchester disc file WF.

Figure 5:
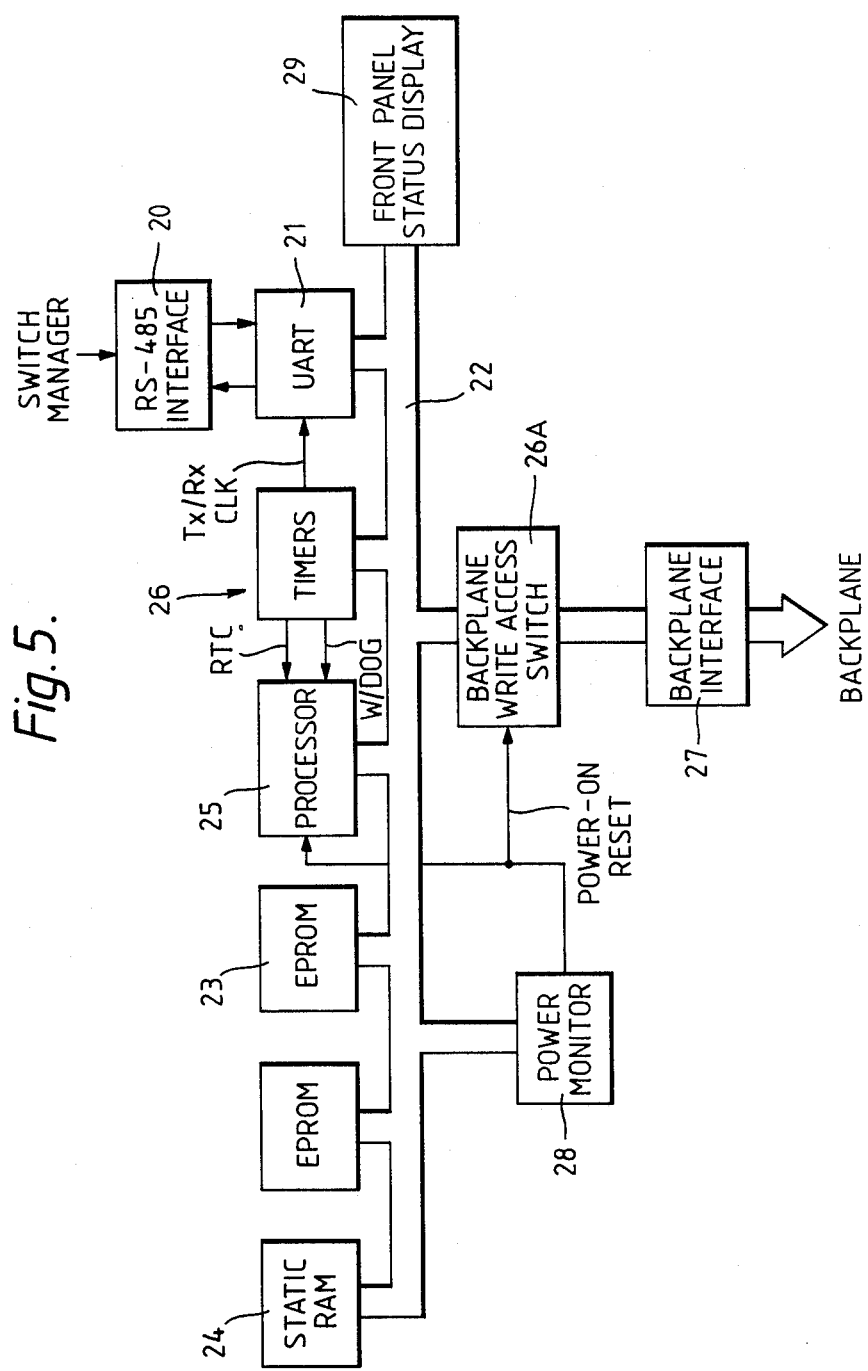
FIG. 5 is a further block diagram, this time of a so-called shelf controller.

We now consider the shelf controller, FIG. 5, both in its hardware and its software aspects. This has its input from the switch manager connected via an RS-485 interface 20 to a UART (Universal Asynchronous Receiver-Transmitter) 21, which is connected to the backplane bus 22 referred to above.

The RS-485 link is capable of operations at speeds of up to 100 K bit/sec. and distances of up to 1300 meters. The link protocol is message-based, and incorporates features including an ACK/NACK (Acknowledge/Not Acknowledge) protocol, "are you there" probes, message re-transmission on receipt of a NACK, and link time out features.

To reduce the number of links to the Switch Manager, all the shelf controller links for the same rack are parallelled on a multi-drop basis, the message structure providing for shelf-addressing. Each shelf is polled individually, and a shelf is able to initiate un-requested messages. A special address in the message address field enables broadcast messages to be sent to all shelf controllers on the same link. Loss of power on a shelf does not disable the link, since RS-485 drivers are required to go "high-impedance" on power-down with no glitches.

The shelf controllers are each configurable as a line circuit controller or as a switch matrix controller, with all necessary program code stored in an EPROM 23 on the controller card. The card is configured by messages from the Switch Manager, this configuration data being stored in non volatile RAM 24. In the case of a switch matrix controller, routing patterns are also stored in the RAM 24. These are duplication of those held in the Switch Manager, and are held locally since, when a change of routing pattern is needed, all switches must be changed simultaneously, and also to give instant restoration of service following a power failure.

Sufficient storage space is provided in the RAM for storing a number, e.g. eight, of "fall-back" routings; these patterns are "lockable", i.e. the Controller is not able to switch to a locked pattern to change that pattern.

The processor 25 periodically implements self-diagnostic checks to ensure that its operation is not impaired. These include a code sum-cneck, a non-destructive RAM check and a non-intrusive peripheral check. In addition, a watch-dog timer is driven by the operational software, as indicated by the connection watchdog between the processor 25 and the timers 26. Failure in any of these causes a failure message to be placed in the link transmit buffer in the interface 20, ready for the next poll, and also causes a backplane write access switch 26A to be disabled. This ensures that under failure conditions the processor 25 is prevented from changing any peripheral set up conditions. The switch 26A is only enabled by a hardware reset of the processor, a power-up or by operation of a reset key.

A line circuit controller monitors line error rates and loss of input alarms at each HDB-3 inputs, and indicates when there is no traffic on that input. It also inserts patterns into the auxiliary channel provided by the 3B6B code to identify the originating port. The code is read at the corresponding port on the other side of the switch to check (a) that no parity violations have occurred, and (b) that the received pattern in the spare bits is as it ought to be, i.e. the switch connection is correct.

A switch matrix controller, on request from the switch manager, reads and transmits to the manager any of the routing patterns held in non-volatile storage. The read-back pattern is compared with the pattern held in storage means at the Switch Manager. The shelf controller can also set up non-intrusive taps into the switch matrix for monitoring line quality.

As the shelf configuration is set up from the Switch Manager, the physical configuration of the cards in a shelf must be known by the shelf controller. The controller, via the general purpose backplane interface 27, FIG. 5 can determine the identity of the card in each slot of the shelf.

Tne shelf controller also includes a power monitor 28, which monitors the status of the dualled power supply units, and it sends a message to the Switch Manager if one of those units fails.

A shelf controller also has a front panel status display 29 which serves to show the status of the controller e.g. running, self diagnostic failure, etc.

A Man Machine Interface MMI (not shown) is provided for local diagnostic purposes. When the maintenances terminal is connected, the link to the Switch Manager (for that Controller only) is broken. The local MMI is password protected, this password being under the control of the Switch Manager.

Switch Manager

The hardware included in the Switch Manager contains the following functions:
(i) Central processor
(ii) 0.5-1.0 Mbyte RAM
(iii) 10 Mbyte Winchester (Mass storage)
(iv) Communication Link to an external system Network Manager
(v) Test Control Link
(vi) Intelligent Communications Controller Of these functions, the processor, RAM, and Winchester form the kernel of the Switch Manager. For the link to the external Manager, an X-25 link can be used.

A Test Control link is provided to link together various items of test equipment e.g. PCM line analysers.

The lntelligent Communications Controller ICC, FIG. 4, provides the interfaces to the Shelf Controllers, one line per rack. It frees the Control processor of all of the low level polling and message protocol activities.

The Switch Manager provides an MMI at 3 levels of priority (a) System Manager, (b) Maintainer, and (c) Operator. These levels are password protected.

The MMI is in the form of menu pages for ease of operation and is a menu driven package.

Multiple log-on ports can be provided, but only one terminal may be logged on at any time, to prevent contention.

If desired, the MMI function may be removed to the distant Network Manager referred to above. The Switch Manager SM, FIG. 4, incorporates in its software an Auto-Routing algorithm to generate the switch matrix patterns from the required circuit connections. In addition to the multiple fall-back patterns a number of fall-back routings are stored (i.e. previous to autorouting), the latter for use in case of switch failure such that reduced service patterns can be quickly generated.

Diagnostic for the Switch Manager include self-diagnostics, which are similar to the self-diagnostic facilities of the Shelf Controller, and shelf diagnostics. Here the Switch Manager 'polls' the Shelf Controllers individually (part of the ICC function) for Diagnostic/Alarm-/Fault conditions.

In addition to the diagnostic functions, traffic data is collected and collated from the Shelf Controllers. All diagnostic information is forwarded to the external Network Manager upon request.

Hardware Variations for Transmission Rates Other Than 2 Mbit/s (a) 6 Mbit/s. The system is as for 2 Mbit/s except that the interface code is B6ZS. A new design of line card is required which translates from B6ZS to 3B6B.

(b) 8 Mbit/s. Again the system is as for 2 Mbit/s: the line card is identical to the 2 Mbit/s one except for component values.

(c) 34 Mbit/s. Instead of 3B6B code a 5B6B code is used which gives a transmission rate of 41.2 Mbit/s. The same crosspoints are used as for 2 Mbit/s. The 5B6B code provides an auxiliary channel for switch monitoring and allows error monitoring. A ULA for 5B6B coding is used.

(d) 45 Mbit/s. Here 5B6B coding is used as for 34 Mbit/s. A modified line card is used to accommodate the interface code of 3BZS.

(e) 140 Mbit/s. Again 5B6B coding is used giving a transmission rate of 167 Mbit/s. However, the complexity of the CMI interface means that only two line circuits per card can be accommodated. The CMOS crosspoint ULA is not adequate at this speed, so MSI ECL 1O K ICs will be used. These enable a one way 64×64 switch to be built on 8 cards.

General

In principle 2, 6 and 8 Mbit/s can coexist on the same switch though line cards of different rates cannot interwork. There does not seem to be any advantage compared with using separate switches, any possible saving in total hardware being offset by complications in maintenance. The control aspects of the switch are not affected by the transmission rate.

All the switches at one site are operated from one switch manager. Thus it would be possible to get co-ordinated switching from 140 Mbit/s to 2 Mbit/s so that particular 2 Mbit/s streams can be switched through multiplex "hierarchy".

I claim:

1. An automatic telecommunications switching arrangement in which:
   electronic switching means is provided via which inlets to and outlets from the arrangement are interconnected;
   coding means is associated with the inlets to and outlets from the network such that intelligence in digital form is handled within the switching arrangement using a redundant line code whose characterics are such that spare code combinations are available, which spare combinations are used to provide auxiliary data channels usable to transmit data through the switching means;
   control means associated with the inlets to the system is provided which inserts into a said auxiliary data channel the inlet port number for a said inlet involved in a connection to be set up from that inlet;
   comparison means associated with each said outlet from the arrangement is provided which receives from an inlet involved in a connection to the said outlet the appropriate inlet port number, said comparision means then comparing the received inlet port number with the expected outlet port number; and
   means responsive to the result of said comparison to indicate the correct or incorrect operation of the switching means, whereby the operation of the arrangement is checked while the arrangement is handling traffic.

2. An arrangement as claimed in claim 1, and in which the redundant line code used within the switching means is of the 3B6B type, ech code combination of which has six binary bits, three of which are 1 bits and three of which are 0 bits.

3. An arrangment as claimed in claim 1, in which the switching means is a three-stage network each stage of which consists of a number of co-ordinate matrices of integrated circuit type.

4. An automatic telecommunications switching arrangement, for interconnecting a number of incoming PCM/TDM trunks and a number of outgoing PCM/TDM trunks with the incoming trunks forming inlets to the arrangement and the outgoing trunks forming outlets from the arrangement, wherein
   a plural-stage electronic switching network is provided via which the inlets to the arrangement and the outlets therefrom are interconnected, each said inlet being connected to an inlet port of the network and each said outlet being connected to an outlet port of the network;
   conversion means associated with each said inlet port converts intelligence to be conveyed, which is in digital form, into a redundant line code in which such intelligence is handled within the switching network, the redundant line code characteristics being such that spare code combinations are available;
   further conversion means associated with each said outlet port converts the intelligence in said redundant line code into the digital format appropriate to the said outgoing trunks;
   the spare code combinations provided by the redundant line code used within the switching means are used to provide auxiliary data channels through the switching network;
   control means associated with said inlet ports causes the data transmitted through the switching network to include for each inlet-outlet connection which is set up the inlet port number for the inlet pport involved in that connection, which number is inserted into said auxiliary data channel during the conversion by the first-mentioned conversion means and extracted from the auxiliary data channel during the conversion by said further conversion means; and
   comparison means associated with the outlet ports function when an outlet port is involved in a connection to compare the inlet port numbers extracted from the auxiliary data channel with the expected inlet port number, the result of said comparision indicating whether the switching network is operating correctly or incorrectly, whereby the operation of the switching arrangment is checked while that switching arrangement is actually handling traffic.

5. An arrangement as claimed in claim 4, wherein the trunks to be interconnected are bidrectional trunks each of which has separate GO and RETURN physical transmission paths, and wherein the switching network is duplicated, separate switching networks being used to interconnect the GO and RETURN highways of the trunks.

* * * * *